US009619138B2

(12) United States Patent
Piippo et al.

(10) Patent No.: US 9,619,138 B2
(45) Date of Patent: Apr. 11, 2017

(54) METHOD AND APPARATUS FOR CONVEYING LOCATION BASED IMAGES BASED ON A FIELD-OF-VIEW

(75) Inventors: Petri Matti Olavi Piippo, Lempäälä (FI); Sampo Tuomas Vaittinen, Helsinki (FI); Juha Henrik Arrasvuori, Tampere (FI)

(73) Assignee: NOKIA CORPORATION, Espoo (FI)

(*) Notice: Subject to any disclaimer, the term of this patent is extended or adjusted under 35 U.S.C. 154(b) by 914 days.

(21) Appl. No.: 13/527,176

(22) Filed: Jun. 19, 2012

(65) Prior Publication Data

US 2013/0335446 A1 Dec. 19, 2013

(51) Int. Cl.
*G06F 3/0488* (2013.01)
*G06F 3/0481* (2013.01)
*G06F 3/0485* (2013.01)

(52) U.S. Cl.
CPC ...... *G06F 3/04883* (2013.01); *G06F 3/04815* (2013.01); *G06F 3/0485* (2013.01); *G06F 2203/04806* (2013.01); *G09G 2340/045* (2013.01)

(58) Field of Classification Search
CPC .... G06T 15/20; G06T 19/003; G06F 3/04815
USPC .................................................. 345/633, 676
See application file for complete search history.

(56) References Cited

U.S. PATENT DOCUMENTS

| | | | |
|---|---|---|---|
| 6,563,529 B1 * | 5/2003 | Jongerius .................... 348/36 |
| 7,654,826 B2 * | 2/2010 | Faulkner et al. ............ 434/130 |
| 7,990,394 B2 * | 8/2011 | Vincent .................. G06T 17/05 |
| | | | 345/419 |
| 2007/0124683 A1 | 5/2007 | Ranin et al. |
| 2008/0066000 A1 * | 3/2008 | Ofek et al. .................... 715/757 |
| 2008/0180439 A1 * | 7/2008 | Adabala et al. ............. 345/421 |
| 2009/0052729 A1 * | 2/2009 | Bae ............................ 382/100 |
| 2009/0119009 A1 * | 5/2009 | Dicke ......................... 701/209 |
| 2010/0123737 A1 * | 5/2010 | Williamson et al. ........ 345/672 |

(Continued)

FOREIGN PATENT DOCUMENTS

| | | |
|---|---|---|
| EP | 2187298 A2 | 5/2010 |
| EP | 2270767 A1 | 1/2011 |
| FR | 2814255 A1 | 3/2002 |

OTHER PUBLICATIONS

International Search Report for corresponding International Patent Application No. PCT/FI2013/050608 mailed Oct. 21, 2013, 4 pages.

(Continued)

*Primary Examiner* — Jeffery A Brier
(74) *Attorney, Agent, or Firm* — Ditthavong & Steiner, P.C.

(57) ABSTRACT

An approach for enabling users to view an image of a location from different fields-of-view is described. A field-of-view generator causes a rendering of a user interface element representing a field-of-view. The field-of-view generator further processes one or more interactions with the user interface element to determine one or more parameters for specifying the field-of-view. The field-of-view generator further determines a portion of at least one panoramic image that is visible in the field-of-view based, at least in part, on the one or more parameters. Still further, the field-of-view generator causes a rendering of the portion of that at least one panoramic image.

21 Claims, 15 Drawing Sheets

(56) References Cited

U.S. PATENT DOCUMENTS

| | | |
|---|---|---|
| 2011/0141141 A1 | 6/2011 | Kankainen |
| 2011/0173565 A1* | 7/2011 | Ofek et al. .................... 715/790 |
| 2011/0279446 A1* | 11/2011 | Castro et al. ................. 345/419 |
| 2012/0194553 A1* | 8/2012 | Osterhout et al. ............ 345/633 |
| 2012/0206452 A1* | 8/2012 | Geisner et al. ............... 345/419 |

OTHER PUBLICATIONS

International Written Opinion for corresponding International Patent Application No. PCT/FI2013/050608 mailed Oct. 21, 2013, 11 pages.

Kopf et al., "Street Slide, Browsing Street Level Imagery", web page, printed Oct. 5, 2012, pp. 1-2, Siggraph 2010, http://research.microsoft.com/en-us/um/people/kopf/street_slide/.

Office Action for corresponding European Patent Application No. 13807027.1-1972, dated Jan. 22, 2016, 5 Pages.

* cited by examiner

100

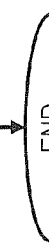
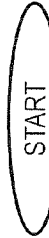
FIG. 3B
308
FIG. 3A
300

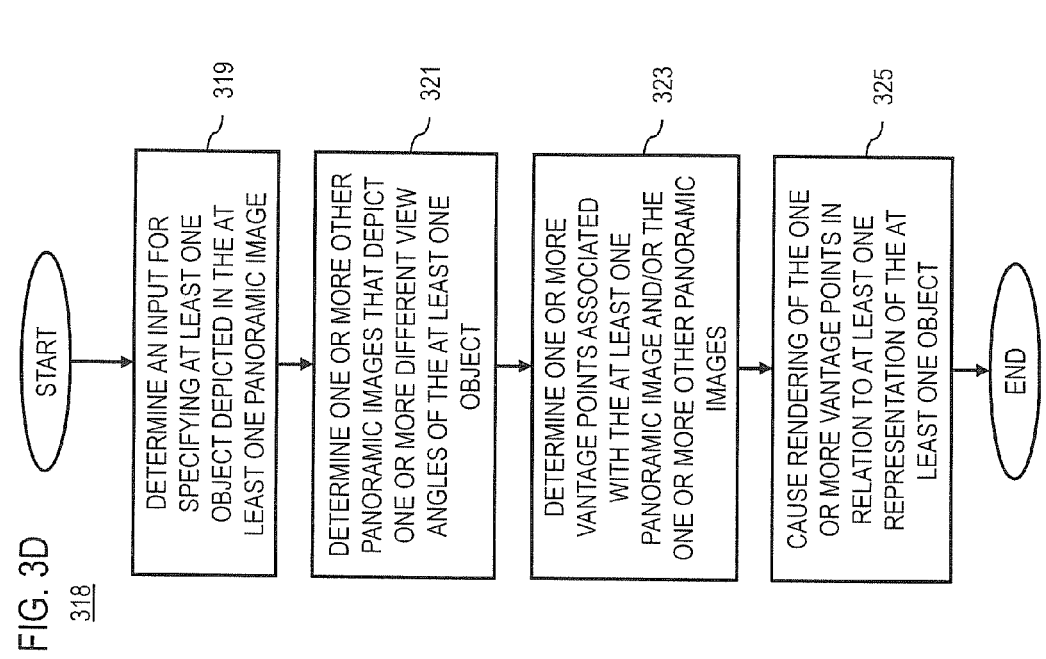
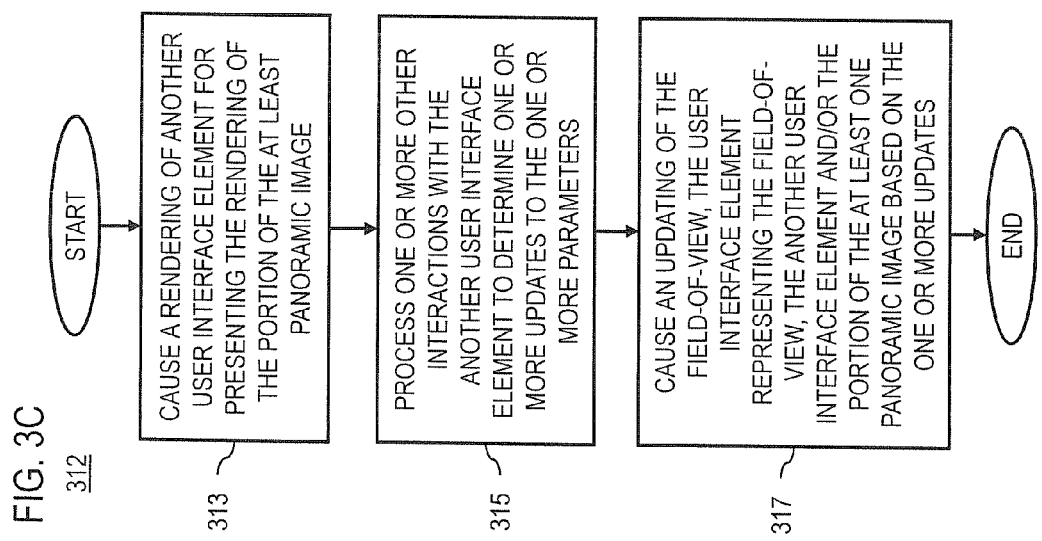

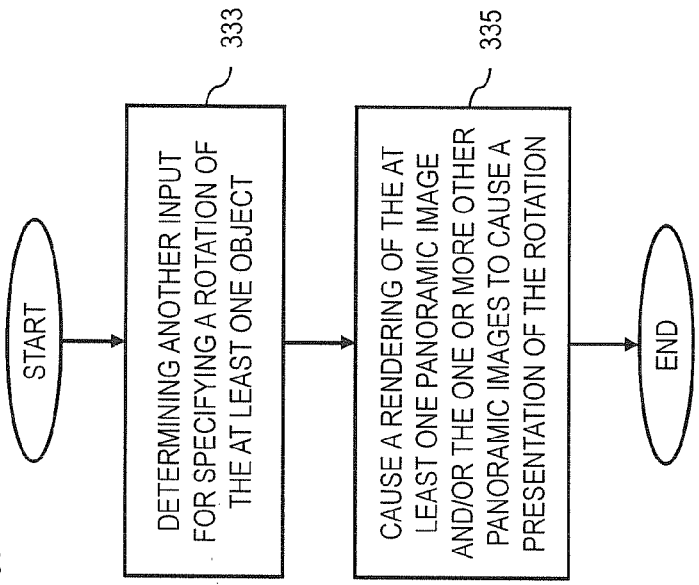
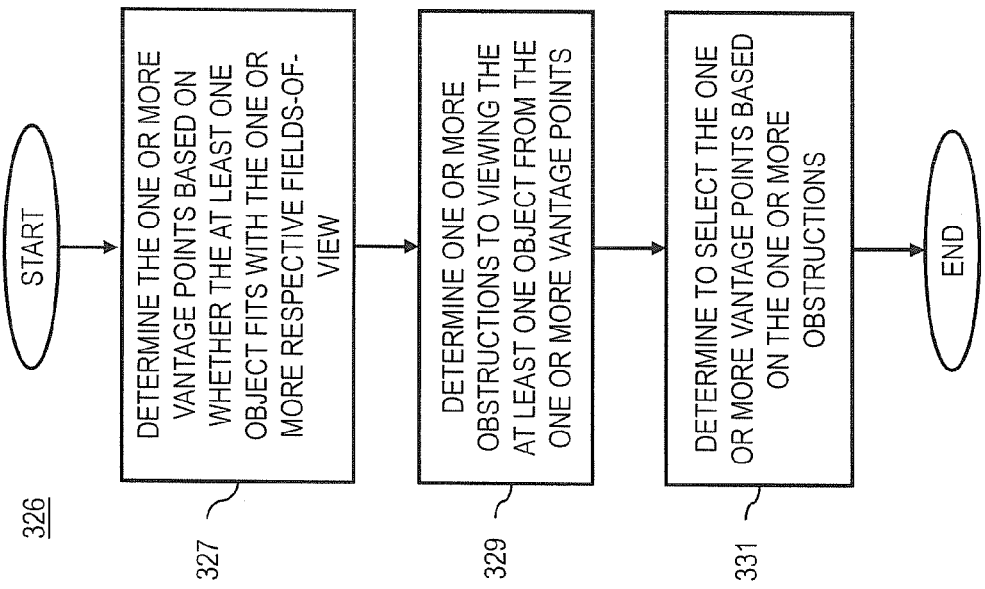

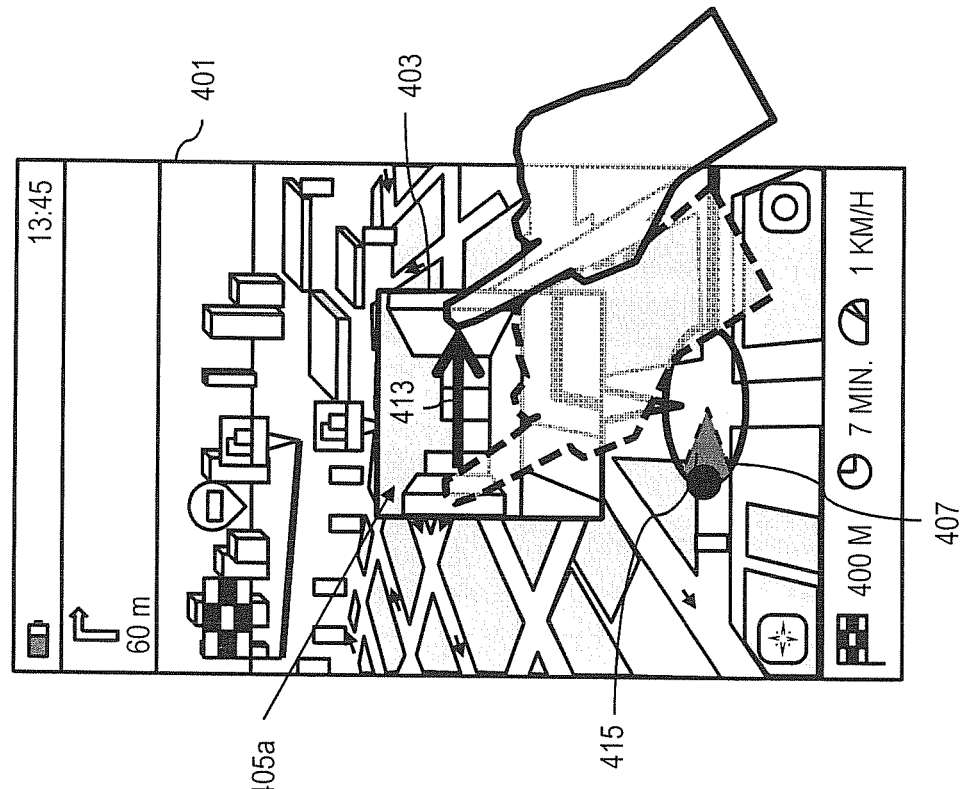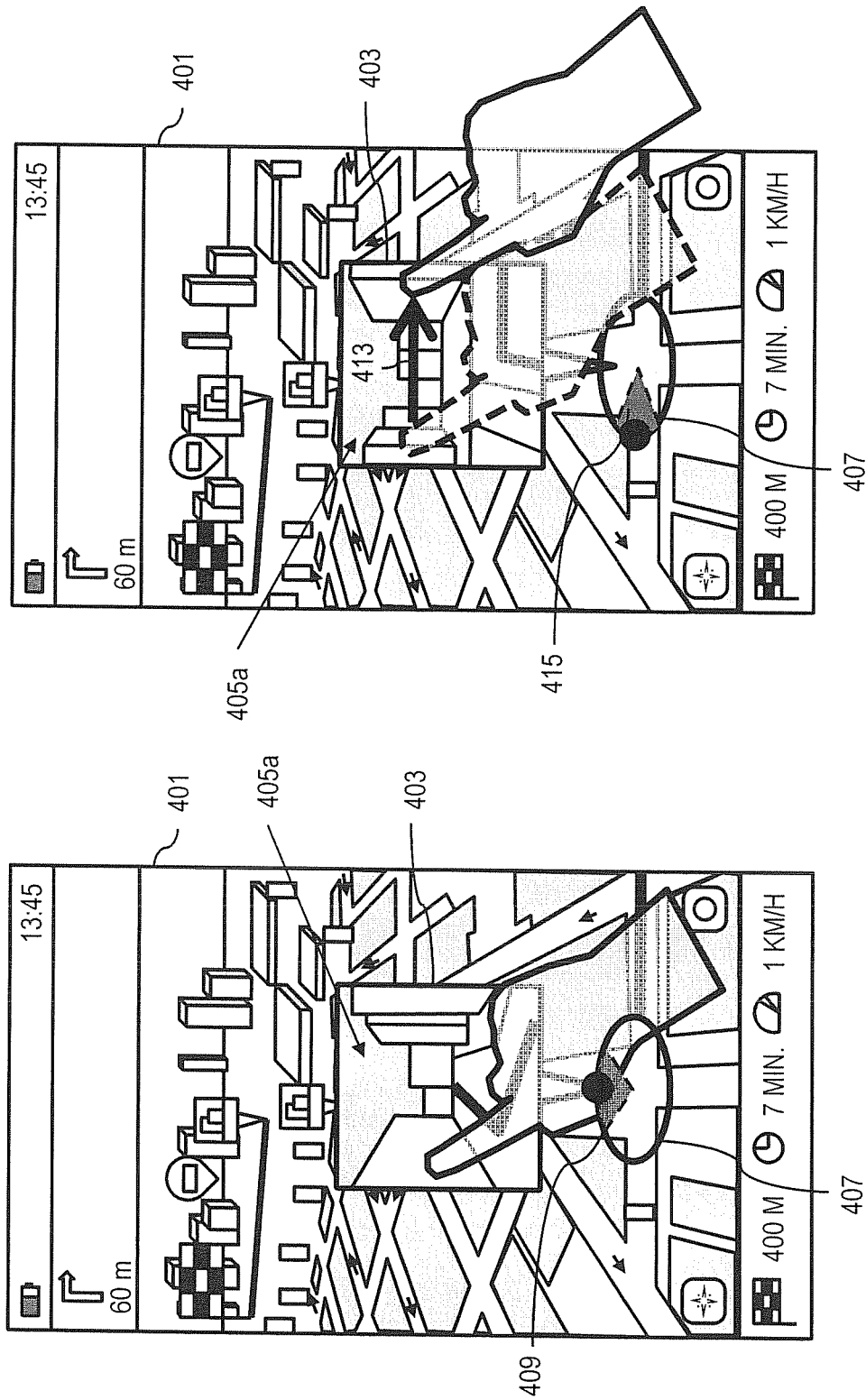

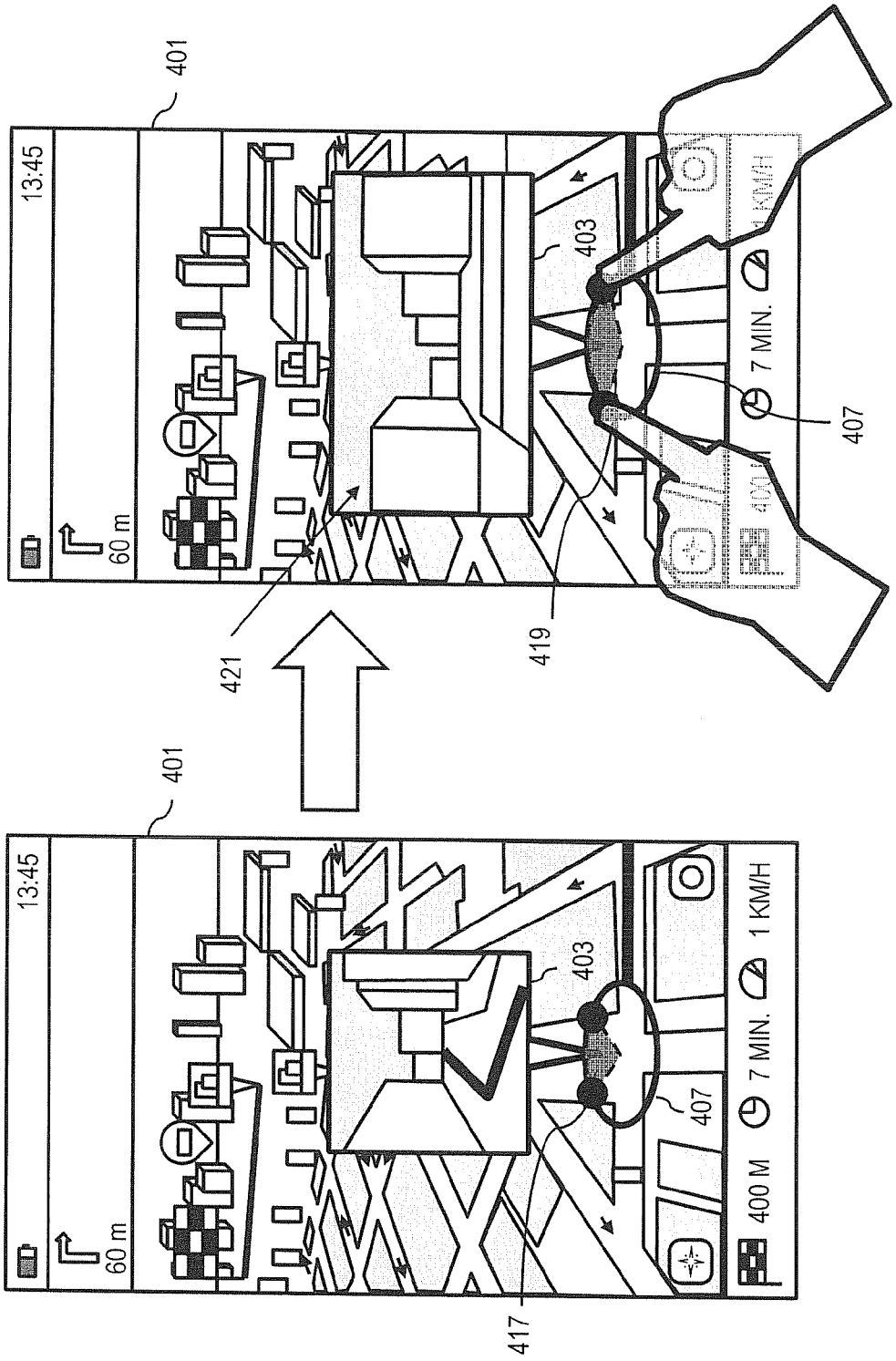

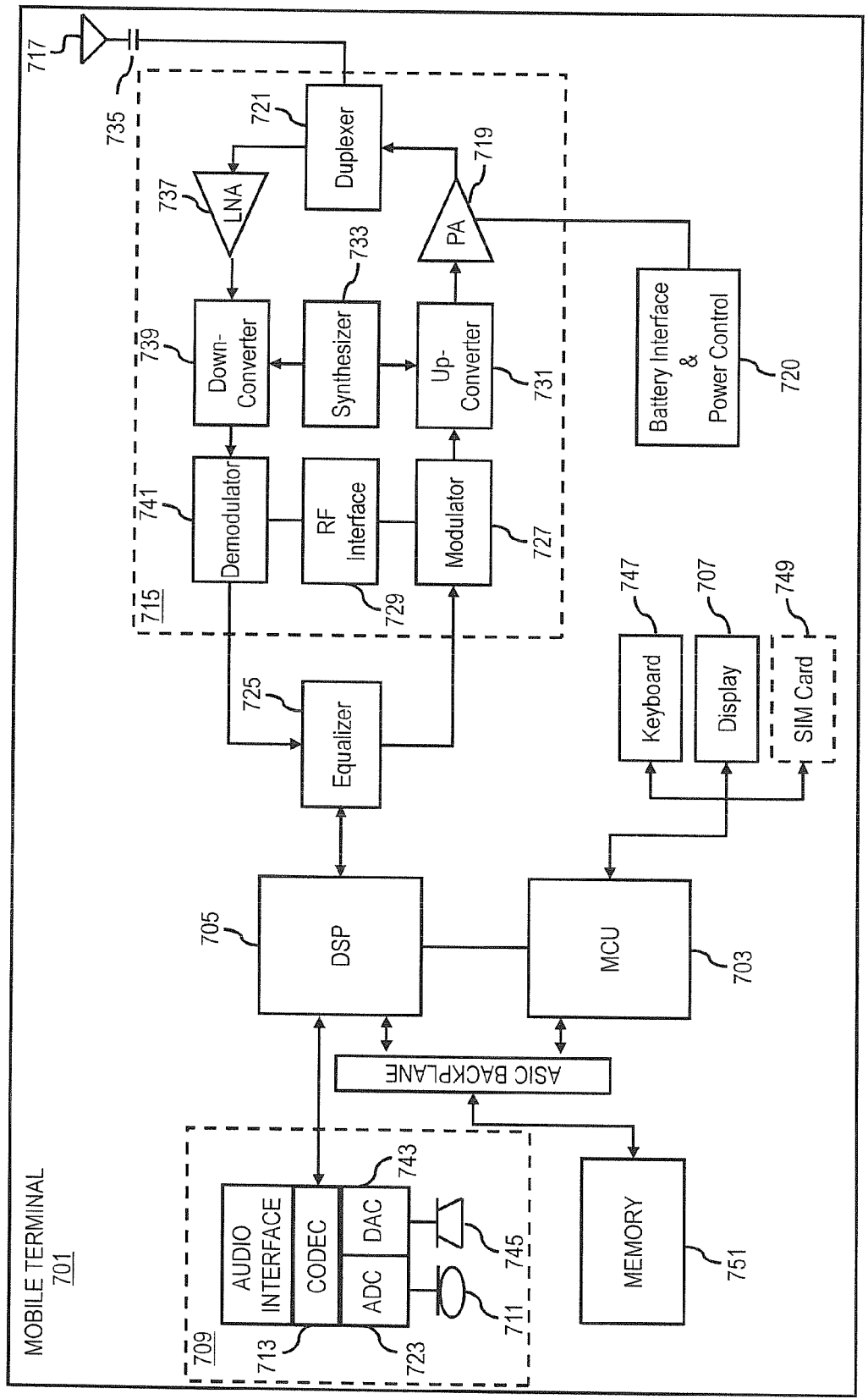

METHOD AND APPARATUS FOR CONVEYING LOCATION BASED IMAGES BASED ON A FIELD-OF-VIEW

BACKGROUND

Service providers and device manufacturers (e.g., wireless, cellular, etc.) are continually challenged to deliver value and convenience to consumers by, for example, providing compelling network services. One area of interest is providing device users with on demand access to routing information such as maps, routes and points-of-interest data. Typically, route options are shown either as lines on a map, as a list of navigation directions or as a graphical depiction of streets, highways, etc., associated with a given location. Unfortunately, there is currently no convenient means of enabling users to view an image of a location from different fields-of-view. In addition, users are limited in their ability to view points-of-interest at a location from varying vantage points while accounting for various obstructions within the immediate proximity.

SOME EXAMPLE EMBODIMENTS

Therefore, there is a need for enabling a user to view a location from different fields-of-view.

According to one embodiment, a method comprises causing, at least in part, a rendering of a user interface element representing a field-of-view. The method further comprises processing and/or facilitating a processing of one or more interactions with the user interface element to determine one or more parameters for specifying the field-of-view. The method further comprises determining a portion of at least one panoramic image that is visible in the field-of-view based, at least in part, on the one or more parameters. The method further comprises causing, at least in part, a rendering of the portion of that at least one panoramic image.

According to another embodiment, an apparatus comprises at least one processor, and at least one memory including computer program code for one or more computer programs, the at least one memory and the computer program code configured to, with the at least one processor, cause, at least in part, the apparatus to cause, at least in part, a rendering of a user interface element representing a field-of-view. The apparatus is also caused to process and/or facilitate a processing of one or more interactions with the user interface element to determine one or more parameters for specifying the field-of-view. The apparatus is also caused to determine a portion of at least one panoramic image that is visible in the field-of-view based, at least in part, on the one or more parameters. The apparatus is also further caused to cause, at least in part, a rendering of the portion of that at least one panoramic image.

According to another embodiment, a computer-readable storage medium carries one or more sequences of one or more instructions which, when executed by one or more processors, cause, at least in part, an apparatus to cause, at least in part, a rendering of a user interface element representing a field-of-view. The apparatus is also caused to process and/or facilitate a processing of one or more interactions with the user interface element to determine one or more parameters for specifying the field-of-view. The apparatus is also caused to determine a portion of at least one panoramic image that is visible in the field-of-view based, at least in part, on the one or more parameters. The apparatus is further caused to cause, at least in part, a rendering of the portion of that at least one panoramic image.

According to another embodiment, an apparatus comprises means for causing, at least in part, a rendering of a user interface element representing a field-of-view. The apparatus also comprises means for processing and/or facilitating a processing of one or more interactions with the user interface element to determine one or more parameters for specifying the field-of-view. The apparatus also comprises means for determining a portion of at least one panoramic image that is visible in the field-of-view based, at least in part, on the one or more parameters. The apparatus further comprises means for causing, at least in part, a rendering of the portion of the at least one panoramic image.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 3A-3F are flowcharts of processes for enabling a user to view a location from different fields-of-view, according to various embodiments;

FIGS. 4A-4L are diagrams of user interfaces utilized in the processes of FIGS. 3A-3F, according to various embodiments;

FIG. 7 is a diagram of a mobile terminal (e.g., handset) that can be used to implement an embodiment of the invention.

DESCRIPTION OF SOME EMBODIMENTS

Examples of a method, apparatus, and computer program for enabling users to view a location from different fields-of-view are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although various embodiments are described with respect to routes generated via a mapping application, it is contemplated that the approach described herein may be used with any service for supporting user travel, location finding and interaction within a given environment. This may include, for example, an event planning application, a social media application, a deal finder/shopping application, a sightseeing application, a travel service or the like.

Figure 1:
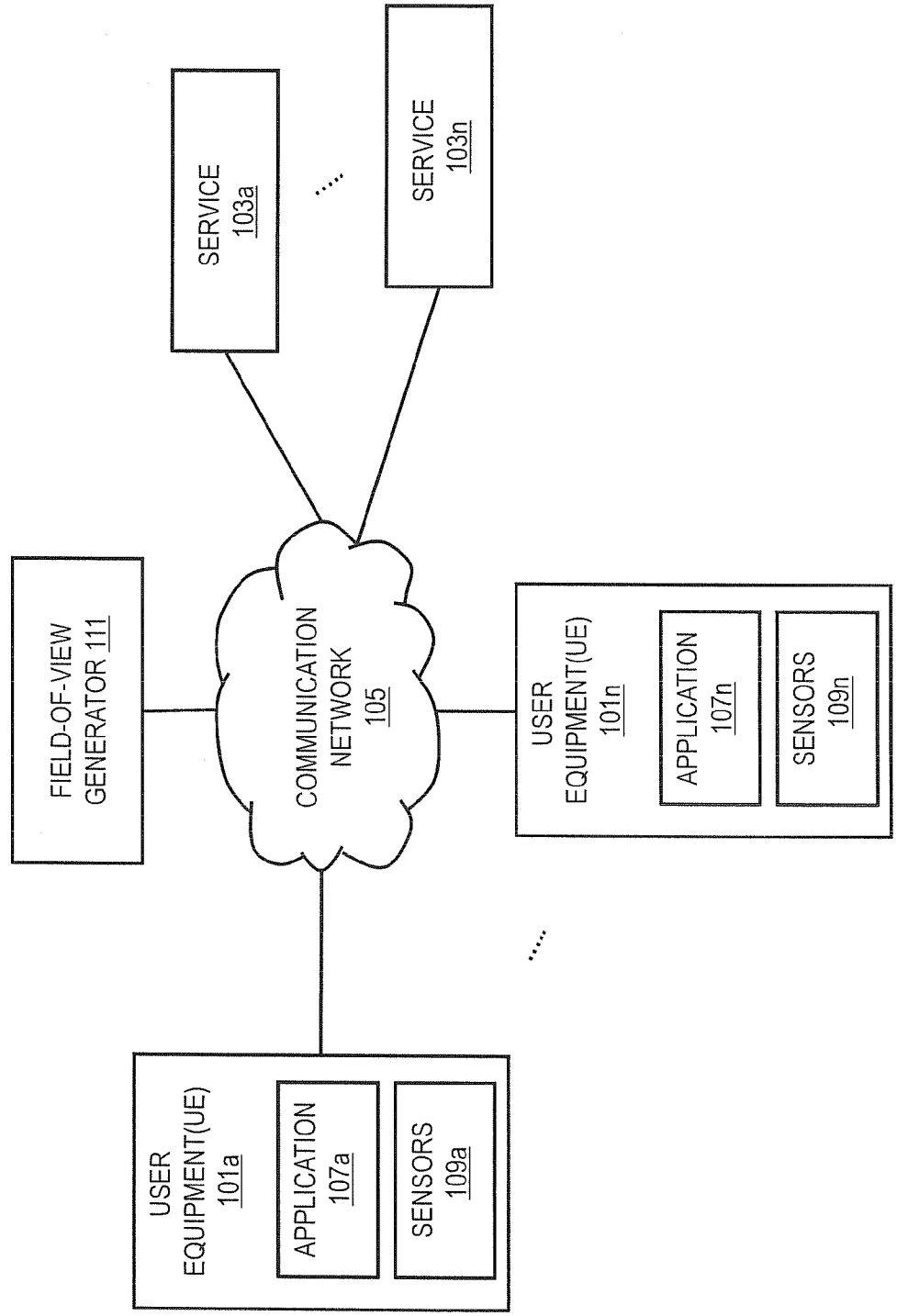
FIG. 1 is a diagram of a system capable of enabling a user to view a location from different fields-of-view, according to one embodiment.

FIG. 1 is a diagram of a system capable of enabling a user to view a location from different fields-of-view, according to one embodiment. By way of example, a field-of-view may pertain to different perspectives of an area, the surroundings or various points-of-interest corresponding to the location. As noted previously, device users regularly rely on routing applications and corresponding services to access information regarding a travel route. By way of such tools, users may access maps for detailing the route, navigation directions, information regarding various points-of-interest (e.g., landmarks, shopping centers) they may encounter, etc. Typically, the routing option is visually depicted as various lines or objects presented to map. In addition, various textual elements may be presented along the map to represent the names of routes in addition to a list of navigation directions.

Unfortunately, most routing applications and services are limited in their ability to enable users to view a location from multiple, different directions and/or perspectives (e.g., fields-of-view). For example, the user may be presented with a picture of the area corresponding to a given location based on a general direction of a compass (e.g., North, West). Because only fixed positions may be viewed, however, the range of perception of the view for the area is limited. Still further, users are limited in their ability to view points-of-interest (POI) corresponding to a given location from different vantage points; including in instances where various obstructions limit the ability to view the POI.

To address this problem, a system 100 of FIG. 1 introduces the capability to generate panoramic images of locations rendered to a user interface, i.e., via a mapping application 107a-107n or corresponding service 103a-103n. For the purpose of illustration, the applications 107a-107n, referred to herein collectively as applications 107, may include a routing application, mapping application, travel planning application or the like. Likewise, the services 103a-103n, referred to herein collectively as services 103, may include a routing service, mapping service, travel planning service, social networking service or the like for interacting with the various applications 107. By way of example, the system 100 includes a field-of-view generator 111 that generates a user interface element for displaying a panoramic image of the location and/or various points-of-interest in connection with the application 107 or service 103. The user interface element is presented in association with a map, navigation route, or other information generated by the mapping application 107 or service 103 for displaying the panoramic image as well as a corresponding field-of-view associated with said image. Of note, the panoramic image and field-of-view are presented to the user relative to a specific location selection.

For the purpose of illustration, the panoramic image depicts a perspective of the scenery from a selected location, wherein the location serves as the focal point for perceiving and/or depicting the surroundings at that location. The panoramic image, as displayed via the user interface element, may include one or more images that are tiled, merged or stitched together. As such, the panoramic image may be panned left or right via the user interface element for enabling a 360 degree view (preview) of the surroundings, or a depiction thereof, from the selected location. In addition, the user interface element may be manipulated by the user via the display of UE 101 to permit an expanded view of the panoramic image.

Alternatively, the user interface element may be associated with an augmented reality application. As such, the images presented may be real-time images corresponding to a given location or those generated via one or more three-dimensional object models. Under this scenario, the user interface element may be caused to adapt the perspective (e.g., the field-of-view) of objects rendered in augmented reality mode in response to changes in user location. For example, the field-of-view may be adapted accordingly as the user approaches a point-of-interest from a specific direction. For the purpose of illustration, the images rendered by the field-of-view generator 111 via the user interface element are described herein primarily from the perspective of panoramic images.

By way of example, the user interface element may be displayed as a window or data bubble that is anchored to a corresponding location. The window may be juxtaposed against a map for depicting a panoramic image associated with the location relative to routing or location information.

Alternatively, the user interface element may be presented in a split-screen view, wherein a portion of the display features the user interface element while another presents the data provided by the mapping application 107 and/or service 103. In certain embodiments, the user interface element may represent an interactive portion of the user interface as presented to the display of the UE 101. Hence, the user may control the user interface element via one or more touch screen inputs or other input means, including controlling a degree of rotation (e.g., panning) of the panoramic image or enabling an expanding of the panoramic image. Of note, the field-of-view generator 111 is configured to process various inputs for facilitating control of the user interface element via operation of the mapping application 107 and/or service 103.

In certain embodiments, the field-of-view generator 111 also presents a representation of a field-of-view in association with the panoramic image via the user interface element. By way of example, the field-of-view corresponds to a finite range of perception of a user relative to the selected location. From the perspective of a panoramic image, the field-of-view corresponds to a finite portion of the panoramic image available for view within the user interface element. The user may therefore increase the field-of-view, and hence range of perception of the location/area, by expanding the dimensions of the user interface element accordingly. Also, the user may adjust the field-of-view by adjusting a portion of the user interface element for controlling the field-of-view, referred to herein as the field-of-view selector. As shown more fully in FIGS. 4A-4L, the field-of-view selector may be rendered to the display as a triangle for representing a view sector of the field-of-view.

Of note, the field-of-view and hence the selector corresponds to a panning of the panoramic image via the user interface element. For example, as the image is panned left or right about a center point corresponding to the selected location, the field-of-view also rotates accordingly. Moreover, when the user manipulates the user interface element to permit a greater amount of panoramic image to be viewed (e.g., enhanced width) the field-of-view selector may also be expanded to represent an increased view sector. This may include, for example, expanding the width of the triangle representing said field-of-view (e.g., 407 of FIG. 4D). The field-of-view generator 111 enables the user to pan the panoramic image at any degree of rotation. As such, the user is able to view an image of the location from any perspective and corresponding field-of-view.

The panoramic image is retrieved by the field-of-view generator 111 by way of a database maintained by the service 103. For example, the images may include those maintained by a mapping service or social networking service. The panoramic images depict various POI corresponding to the location, including for example, buildings, landmarks, streets, intersections and the like. Hence, the image presented via the user interface element directly correlates to the determined or specified location of the user. The field-of-view generator 111 may cause retrieval of the images in connection with the mapping service 103, which may further execute the query based on data collected by the sensors 109 of the UE 101. In the case of a mapping service, for example, the images may be captured using aircraft (e.g., airplanes, helicopters) or car-mounted cameras in conjunction with location information and laser range finder information. This two dimensional panoramic image data may then be further compiled into a three dimensional model representative of the environment corresponding to the location. As such, the 3D models might also be acquired separately and the range finder information used only to align the models with the panoramic images.

In another embodiment, the field-of-view generator 111 operates in connection with the services 103 or applications 107 to permit the viewing of a select point-of-interest from multiple vantage points. By way of example, the multiple vantage points correspond to different fixed positions and fields-of-view of the POI relative to or within proximity of the selected location. Under this scenario, for example, a building may be selected to be viewed from multiple different vantage points about its perimeter, each vantage point corresponding to an image from said perspective. The field-of-view generator 111 enables the user interface element to present the panoramic image of the POI for the selected vantage point as well as depict a field-of-view for said vantage point.

By way of example, the user may select a specific POI and vantage point to view based on user provided input. This may include a touch screen input selection as rendered to the two dimensional map of the location. Based on this input, the field-of-view generator 111 causes the building to be highlighted within the map along with the presentment of various vantage point selection indicators. In certain embodiments, the vantage point selection indicators are juxtaposed against the map rendered by the mapping application 107 and/or service 103. Hence, in the case of a building, the vantage point selection indicators are featured along the perimeter of the building based on a two dimensional aerial view or top-to-down view. Each vantage point selection indicator also depicts the corresponding field-of-view, i.e., displays a triangle for representing a view sector.

Upon selection of a vantage point, the panoramic image corresponding to the building is shown within a user interface element as the focal point of the image. The user interface element for presenting the image may be shown as anchored to the location of the building or featured in another portion of the user interface—i.e., a corner of the display. The field-of-view generator 111 causes the user interface element to display the associated panoramic image of the building from the vantage point (e.g., back, side, front, first entrance, service door). In addition, the user may select the POI shown within the image presented from said vantage point. For example, in the case of a building as the focal point of the image, an adjacent building may be selected. By way of this approach, any POI within the field-of-view for a given panoramic image may be selected including those that or only partially visible, offset from the current center of the image (e.g., to the left or right of center), etc.

In certain embodiments, the user may provide further input for interacting with the field-of-view generator 111 relative to a selected vantage point. For example, the user may drag or flick their finger across the user interface element to traverse through the various images of the building from differing vantage points. Alternatively, the client may automatically show each vantage point for a couple of seconds and then move on to the next available vantage point image of the building. Under this scenario, the building stays centered within the panoramic image and may be shown in connection with the highlighted representation of the building along the map. In addition, the panoramic images could also be displayed in connection with various tags for specifying details regarding the featured POI (e.g., the name and description of a shop attached to the building). For this example, the entrance to the shop may only be on one side of the building such that the shop is only shown from a single corresponding vantage point.

By way of example, the field-of-view generator 111 enables one or more of the following: (1) process an input for specifying a field-of-view to associate with a location, at least one point-of-interest associated with the location, or a combination thereof via an interactive user interface element; (2) determine a panoramic image to associate with the at least one location, the at least one point-of-interest associated with the location, or a combination thereof based, at least in part, on the field-of-view; (3) cause, at least in part, a rendering of a panoramic image via the interactive user interface element for depicting the location, the at least one point-of-interest associated with the location, or a combination thereof to a display of a user device based, at least in part, on the input; (4) enable selection of various points-of-interest from different vantage points; (5) enable full rotation panning of the panoramic image relative to a selected location or expansion of the interactive user interface element for expanding the field-of-view. Of note, the field-of-view generator 111 enables a user to more readily access a view to points-of-interest within a city scene, cityscape, etc., from different available vantage points.

As shown in FIG. 1, the system 100 comprises user equipment (UE) 101 having connectivity to the field-of-view generator 111 via a communication network 105. By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, the UE 101, field-of-view generator 111, applications 107 and various services 103 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
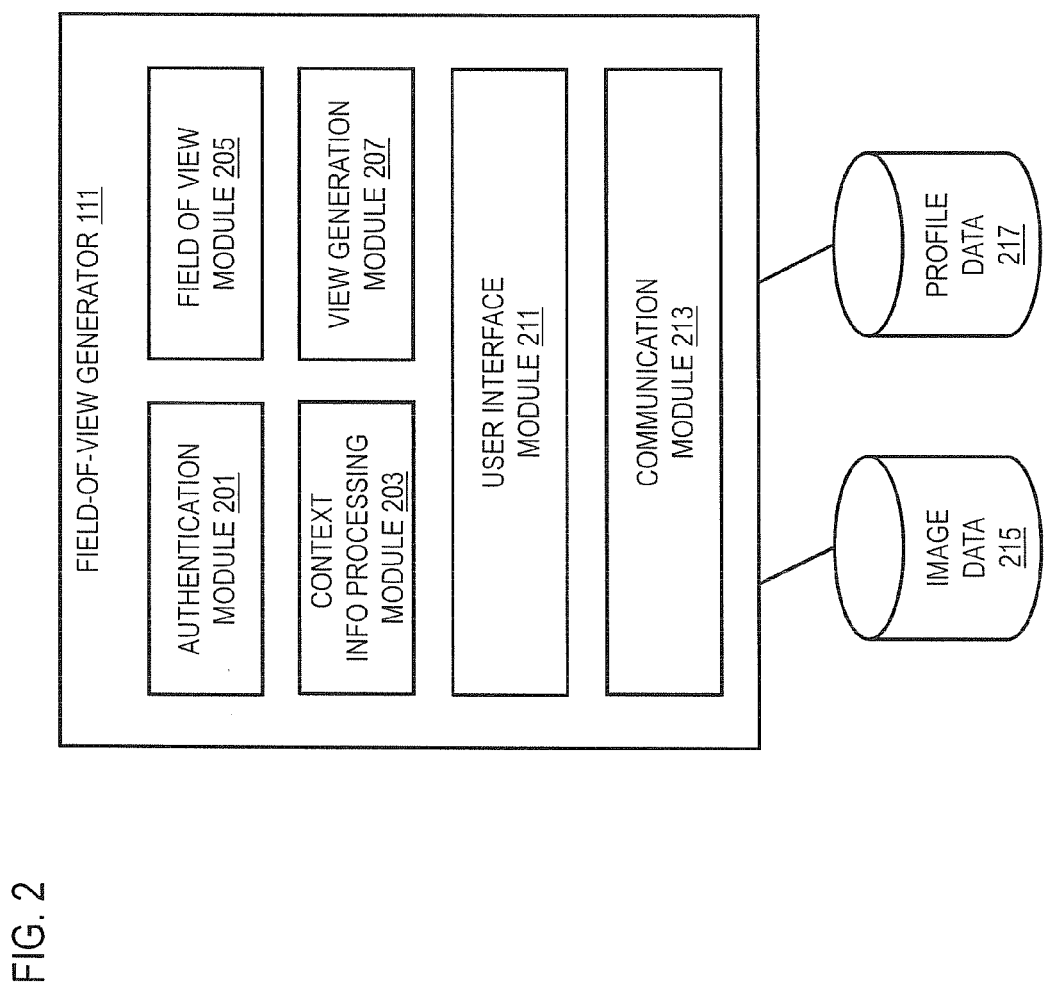
FIG. 2 is a diagram of the components of a field-of-view generator, according to one embodiment.

FIG. 2 is a diagram of the components of a field-of-view generator, according to one embodiment. By way of example, the field-of-view generator 111 includes one or more components for generating a panoramic image for depicting a selected travel route, according to one embodiment. It is contemplated that the functions of these components may be combined in one or more components or performed by other components of equivalent functionality. In this embodiment, the field-of-view generator 111 includes an authentication module 201, context information processing module 203, field-of-view module 205, view generation module 209, user interface module 211 and communication module 213.

The aforementioned modules 201-213 of the field-of-view generator 111 may also access one or more databases 215 and 217 or performing various executions. This includes, for example, an optional image database 215 for accessing various images for depicting the different panoramic images for a given location. The images may depict various points-of-interest (POI) such as buildings and landmarks. Also included is a profile database 217 for maintaining profile information related to one or more users subscribed to and/or associated with the field-of-view generator 111. It is noted that the image data 215 may be maintained by the field-of-view generator or optionally access from a service (e.g., mapping service).

In one embodiment, an authentication module 201 authenticates users and UE 101a-101n for interaction with the field-of-view generator 111. By way of example, the authentication module 201 receives a request to subscribe to the field-of-view generator 111 for enabling generation of panoramic images in connection with a selected location. The subscription process may include, for example, establishing one or more services the user is affiliated with as well as their respective access credential information. Subscription may also entail selection of an "opt-in" option, wherein users of the field-of-view generator 111 permits sharing of their context information (e.g., location information, position information and temporal information) as collected via one or more sensors 109 of UE 101. Preferences and settings information may be referenced to a specific user, user device, or combination thereof and maintained as profile data 117. It is further noted, in certain embodiments, that the subscription process may be coordinated with a subscription process of a given service 103 accessed by a user. For example, various input data required for a user to subscribe to a location based service or other service 103 may be used for establishing profile data 117 for the field-of-view generator 111.

The authentication process performed by the module 201 may also include receiving and validating a login name and/or user identification value as provided or established for a particular user during a subscription or registration process with the service provider. The login name and/or user identification value may be received as input provided by the user from the user device 101 or other device via a graphical user interface to the field-of-view generator 111 (e.g., as enabled by user interface module 211). Profile data pursuant to registration may be cross referenced as part of the login process. Alternatively, the login process may be performed through automated association of profile settings maintained as profile data 217 with an IP address, a carrier detection signal of a user device, mobile directory number (MDN), subscriber identity module (SIM) (e.g., of a SIM card), radio frequency identifier (RFID) tag or other identifier.

The authentication module 201 may also be alerted of an input received via the user interface for indicating a user requested action. For example, the request may be a type of touch input for indicating an expansion of a user interface element as generated via the user interface module 211. As another example, the touch input may be a selection of a specific location and/or point-of-interest for viewing of a specific vantage point related panoramic image. It is noted that the user interface module 211 supports presentment of the user interface element for presenting such panoramic images (e.g., via data 215) while the authentication module 201 interprets input provided to the user as they engage the field-of-view generator 111. The authentication module 201 is therefore configured to receive requests for generation of a panoramic image via the service or application.

In one embodiment, the context information processing module 203 receives context information as gathered by the sensors 109*a*-109*n* of respective UE 101*a*-101*n*. Once received, the context information processing module 203 analyzes the context information 113 to determine the relative location, time, position and other information useful for generating a panoramic image in association with a specified location. Based on this determination, the context information processing module 203 triggers execution of the view generation module 207, which facilitates the querying/retrieval associated panoramic image data from a database (e.g., as maintained by a mapping service provider) corresponding to the location.

In one embodiment, the view generation module 207 facilitates gathering of the various images corresponding to a location selected via a mapping application or service. In addition, the view generation module 207 determines and/or retrieves the various images corresponding to a specified vantage point of a POI. By way of example, in the case of a general view of a location, the view generation module 209 compiles the various images into a 360 degree panoramic image. In the case of a vantage point related view, the view generation module correlates an image with a given vantage point.

It is noted, in certain embodiments, that the view generation module 207 may facilitate various image rendering, blending, merging and other compilation techniques for producing a panoramic image. Of note, information provided by the field-of-view module 205 may also be used for generation of the panoramic image.

In one embodiment, the field-of-view module 205 operates in connection with the view generation module 207 to determine an updated field-of-view to associate with a user interface element and associated location. The field-of-view is modified based on input detected by the authentication module 201. In addition, the context information processing module 203 may process current position information for the user and provide this information to the field-of-view module 205. Under this scenario, the field-of-view module 205 correlates the current position of the user to a specific field-of-view, i.e., to support real-time location and position tracking against a map. Still further, this correlation enables the image retrieved by the view generation module 207 to be that which best matches the current vantage point of the user.

The field-of-view module 205 may also be configured to operate in connection with an augmented reality application. For example, the field-of-view module 205 may retrieve real-time image data corresponding to the location, such as from a live camera feed, for supporting an augmented reality view. As in the case of a panoramic view, the field-of-view module 205 correlates the appropriate augmented reality view with the location. Under this scenario, the user may select a particular POI to view at a given location (e.g., a building) while the resulting viewpoints would be a corresponding panoramic image. It is noted, therefore, that the image data retrieved for the augmented reality application would only be that required to select the desired building while the other image data is panoramic image data.

In one embodiment the user interface module 211 enables presentment of a graphical user interface for presenting panoramic images in connection with a selected location. By way of example, the user interface module 211 generates the user interface element in response to detection of an input for selection of a location in a map. As another example, the user interface module 211 enables highlighting of a specific POI presented via the user interface. Of note, the user interface module triggers execution of the various other modules, including the authentication module 201, field-of-view module 205 and view generation module 207 in response to user input.

The user interface module 201 employs various application programming interfaces (APIs) or other function calls corresponding to the application 107 of UE 101*a*-101*n*; thus enabling the display of graphics primitives such as menus, buttons, data entry fields, etc., for generating the user interface elements. Still further, the user interface module 211 may be configured to operate in connection with augmented reality (AR) processing techniques, wherein various different applications, graphic elements and features may interact within the same view at the UE 101. For example, the user interface module 201 may coordinate the presentment of augmented reality images in conjunction with various panoramic images for a given location or in response to a selected vantage point.

In one embodiment, a communication module 213 enables formation of a session over a network 105 between the field-of-view generator 111 and the services 103. By way of example, the communication module 213 executes various protocols and data sharing techniques for enabling collaborative execution between a subscriber's UE 101a-101n (e.g., mobile devices, laptops, smartphones, tablet computers, desktop computers) and the field-of-view generator 111 over the network 105.

The above presented modules and components of the field-of-view generator 111 can be implemented in hardware, firmware, software, or a combination thereof. Though depicted as a separate entity in FIG. 1, it is contemplated that the field-of-view generator 111 may be implemented for direct operation by respective UE 101. As such, the field-of-view generator 111 may generate direct signal inputs by way of the operating system of the UE 101 for interacting with the application 107. In another embodiment, one or more of the modules 201-213 may be implemented for operation by respective UEs, as a field-of-view generator 111, or combination thereof. Still further, the field-of-view generator 111 may be integrated for direct operation with a service 103, such as in the form of a widget or applet, in accordance with an information and/or subscriber sharing arrangement. The various executions presented herein contemplate any and all arrangements and models.

Figure 6:
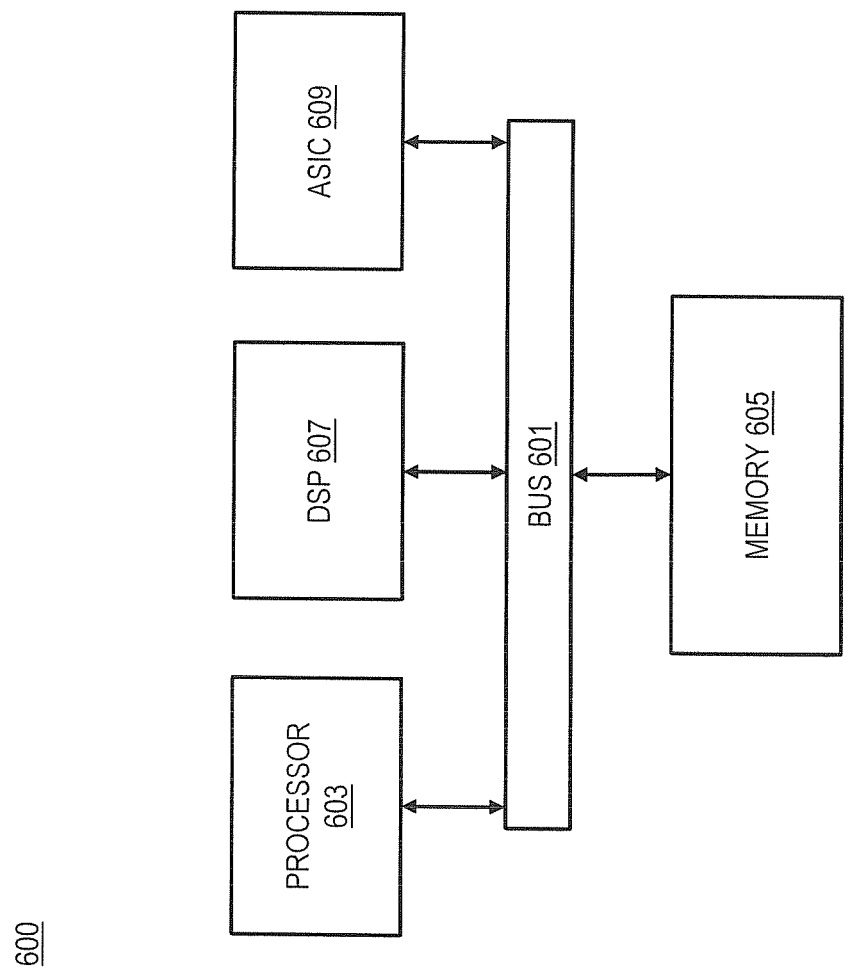
FIG. 6 is a diagram of a chip set that can be used to implement an embodiment of the invention.

FIGS. 3A-3F are flowcharts of processes for enabling a user to view a location from different fields-of-view, according to various embodiments. In one embodiment, the field-of-view generator 111 performs processes 300, 308, 312, 318, 326 and 332 and is implemented in, for instance, a chip set including a processor and a memory as shown in FIG. 6.

In step 301 of process 300 (FIG. 3A), the field-of-view generator 111 causes a rendering of a user interface element representing a field-of-view. In step 303, the field-of-view generator 111 processes one or more interactions with the user interface element to determine one or more parameters for specifying the field-of-view. This may include, for example, input entered via the user interface element for indicating an extent of panning of a panoramic image or a degree or rotation of a triangular indicator for depicting the field-of-view. In another step 305, the field-of-view generator 111 determines a portion of at least one panoramic image that is visible in the field-of-view based on the one or more parameters. Per step 307, the generator 111 also a causes a rendering of the portion of that at least one panoramic image.

In step 309 of process 308 (FIG. 3B), the field-of-view generator 111 determines a location associated with the field-of-view. Per step 311, the generator 111 causes, at least in part, a rendering of the user interface element in a location-based user interface, an augmented reality user interface, or a combination thereof based at least in part, on the location. The location based interface may correspond to that provided by a mapping application 107 and/or corresponding mapping service 103. As noted previously, any location based service may employ the various executions provided via the field-of-view generator 111. Furthermore, the user interface element includes, at least in part, at least one representation of the field-of-view. The field-of-view may include, at least in part, a rendering of a triangle to represent a view sector of the field-of-view.

In step 313 of process 312 (FIG. 3C), the field-of-view generator 111 causes a rendering of another user interface element for presenting the rendering of the portion of the at least one panoramic image. In another step 315, the generator 111 processes and/or facilitates a processing of one or more other interactions with the another user interface element to determine one or more updates to the one or more parameters. This updating corresponds to the provisioning of addition user input via the user interface as presented to the display of a UE 101. Per step 317, the field-of-view generator 111 causes an updating of the field-of-view, the user interface element representing the field-of-view, the another user interface element, the portion of the at least one panoramic image, or a combination thereof based, at least in part, on the one or more updates.

Per step 319 of process 318 (FIG. 3D), the field-of-view generator 111 determines an input for specifying at least one object depicted in the at least one panoramic image. In another step 321, the generator 111 determines one or more other panoramic images that depict one or more different view angles of the at least one object. As noted previously, the object may include a specific point-of-interest, including that which may be featured and/or depicted via a given panoramic image. In step 323, the field-of-view generator 111 determines one or more vantage points associated with the at least one panoramic image and/or the one or more other panoramic images. The generator 111 also causes rendering of the one or more vantage points in relation to at least one representation of the at least one object, corresponding to step 325. Of note, the one or more vantage points are based, at least in part, on one or more respective locations, one or more respective fields-of-view, or a combination thereof associated with the one or more different view angles of the at least one object.

In step 327 of processing 326 (FIG. 3E), the generator 111 determines the one or more vantage points based on whether the at least one object fits with the one or more respective fields-of-view. The generator also determines one or more obstructions to viewing the at least one object from the one or more vantage points, corresponding to step 329. Per step 331, the generator 111 determines to select the one or more vantage points based on the one or more obstructions. For example, the field-of-view generator only enables the viewing of those vantage points that can be witnessed by the user from a specific field-of-view.

In step 333 of process 332 (FIG. 3F), the field-of-view generator 111 determines another input for specifying a rotation of the at least one object (e.g., the point-of-interest). The field-of-view generator 111 also causes a rendering of the at least one panoramic image and/or the one or more other panoramic images to cause a presentation of the rotation. It is noted that the field-of-view generator 111 overcomes limitations associated with traditional approaches to presenting mapping information and/or associated images such as limited degrees of rotation, user defined panoramic viewing of images associated with a select location and vantage point based viewing of select points-of-interest.

FIGS. 4A-4L are diagrams of user interfaces utilized in the processes of FIGS. 3A-3F, according to various embodiments. For the purpose of illustration, the diagrams are described with respect to an exemplary use case of a user interacting with the field-of-view generator 111 via a mobile device. In this example, the user is presented with various panoramic images, via a user interface element, in response to selection of a location and/or point-of-interest via a mapping application interface.

Figure 4A:
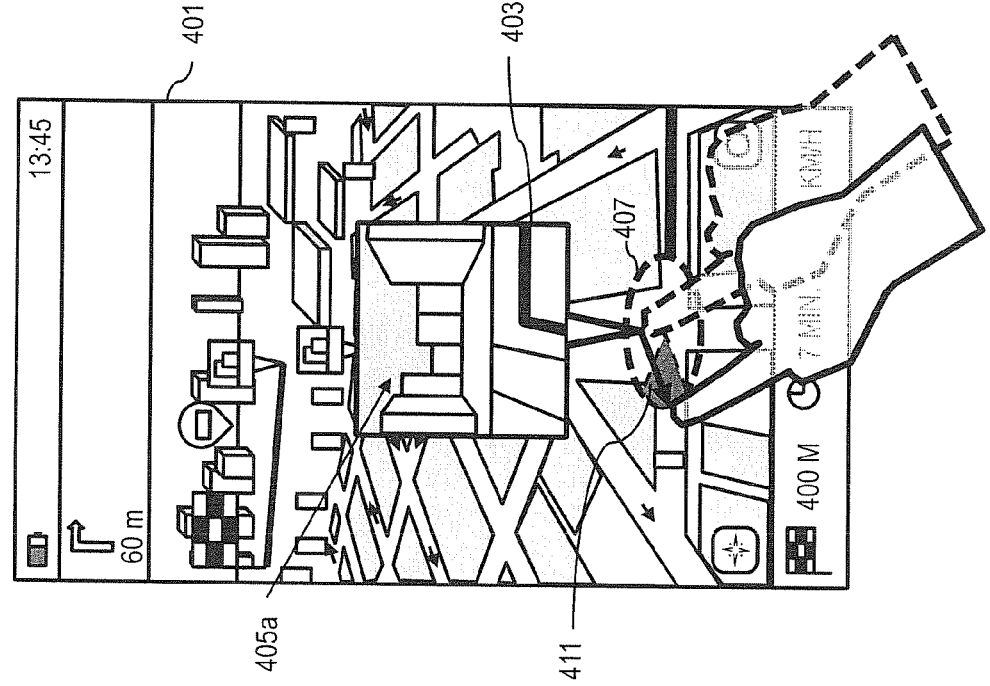
Figure 4B:
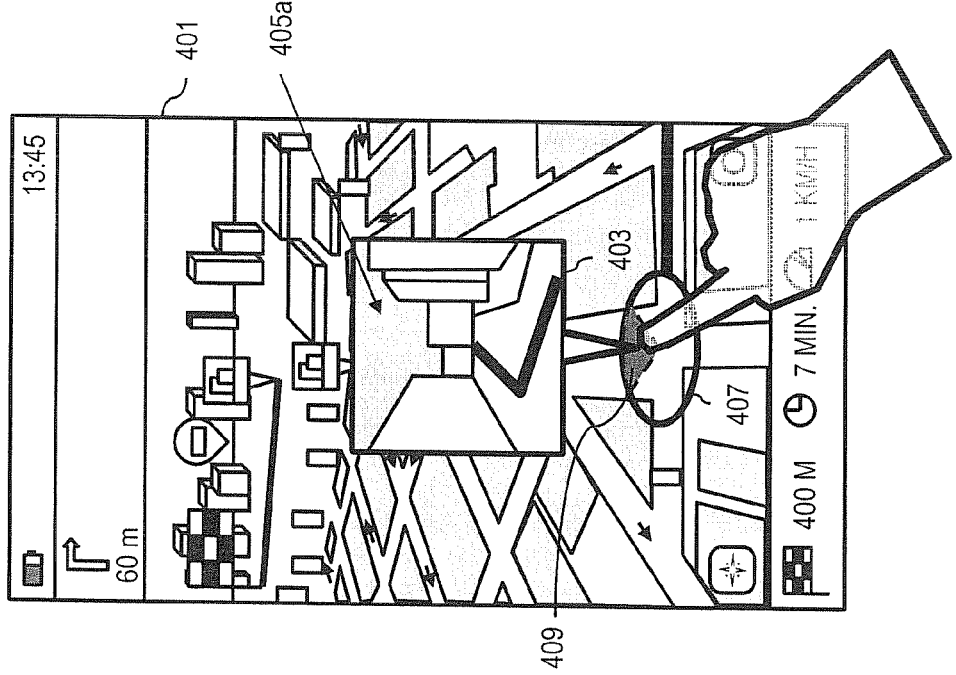

In FIGS. 4A and 4B, the user is presented (to display 401) with mapping information via a mapping application and/or service. The interface features various objects depicting streets, roads, buildings and other representations of elements corresponding to a map. By way of touch based input, the user clicks on a specific location on the interface. In response, the field-of-view generator 111 renders a user interface element 403 for presenting a panorama image 405a corresponding to the selected location. The panoramic image 405a features various points-of-interest associated with the selected location, including one or more buildings, a street view, etc.

Also, another user interface element 407 is presented in connection with the first user interface element 403 for depicting the selected location and current field-of-view associated with the panoramic image 405a. The field-of-view is represented, by way of example, as a triangle 409 for specifying a view sector of the user relative to the selection location. Of note, the field-of-view may also correspond to a current position/orientation of the user, i.e., a direction the user is facing, in instances where the map is associated with a real-time location tracking service. The other user interface element 407 is configured to receive an input for enabling user adaptation of the field-of-view. Hence, the view direction can be changed by pivoting the triangle 409 about the user interface element 407 (circularly in this case), as depicted in FIG. 4B by leftward directed line 411. Resultantly, the panoramic image 405a corresponding to the newly selected field-of-view is shown within the user interface element 403.

As shown in FIGS. 4C-4D, the view direction can be changed by flicking the panoramic image 405a in a given horizontal direction as it is presented via the user interface element 403. By way of example, when the user places their finger at a leftmost edge of the user interface element 403 as shown in FIG. 4C and gestures rightward 413 towards the rightmost edge as shown in FIG. 4D, the panoramic image 405a pans left to reveal an updated portion 405a of said image. Resultantly, the field-of-view at the corresponding location per 407 is also updated, thus reflecting a new position/orientation of the triangle 415. Although not illustrated in FIGS. 4C and 4D expressly, one or more vantage points could also be presented relative to user interface 407 for enabling viewing of different perspectives of a given point-of-interest associated with the location.

As shown in FIGS. 4E-4F, the extent of viewing of the panoramic image can be adjusted by the user by widening the view sector as presented in connection with user interface element 407. By way of example, in FIG. 4E, a first view sector (e.g., triangle 417) corresponding a first field-of-view may be adapted, for example, through two-finger interaction as depicted in FIG. 4F. Under this scenario, the user places their fingers along opposing edges of the user interface element 407 to and moves their fingers away (outward). As a result, a second view section (e.g., triangle 419) is generated corresponding to a second field-of-view. Of note, widening of the view sector also widens the user interface element 403. This enables more of the panoramic image 421 to be revealed.

In certain embodiments, panning of the panoramic image 421 as shown enables a user to more readily view and identify POI in the area (at the location) as associated with the facades of the buildings. Also, the widened panoramic image 421 per widened user interface element 403 is achieved at the client device by the field-of-view generator 111 based on server side stitching, merging and other processing of images to render a 360 panoramic image.

Figure 4H:
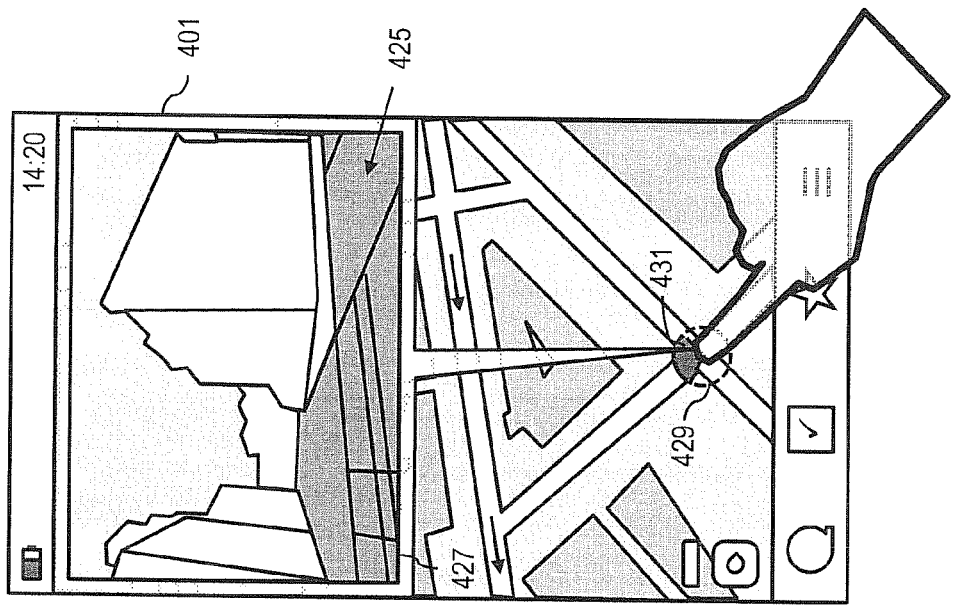
Figure 4G:
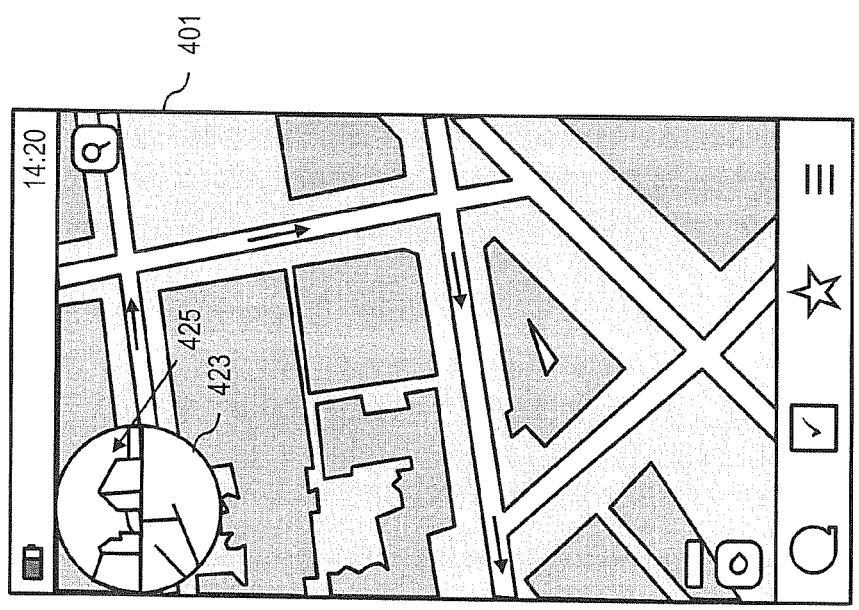

In FIGS. 4G and 4H, the user clicks on a two dimensional top-to-down map view, as presented to the user interface 401. Each view presents a panoramic image corresponding to a location on the map. For example, in FIG. 4G, the user interface element 423 for presenting an image 425 corresponding to a location on the map is shown as anchored to a corner of the map view. In FIG. 4H, a more expanded view is presented in relation to the location via user interface element 427. User element 423 may correspond to a toggle view, wherein the user toggles between the collapsed view 423 and a full view 427 to permit full viewing of the 2D map. Under this scenario, a vantage point selector indicator 429 with corresponding field-of-view indicator 431 is presented as a user interface element for depicting a current vantage point associated with the image 425.

Figure 4I:
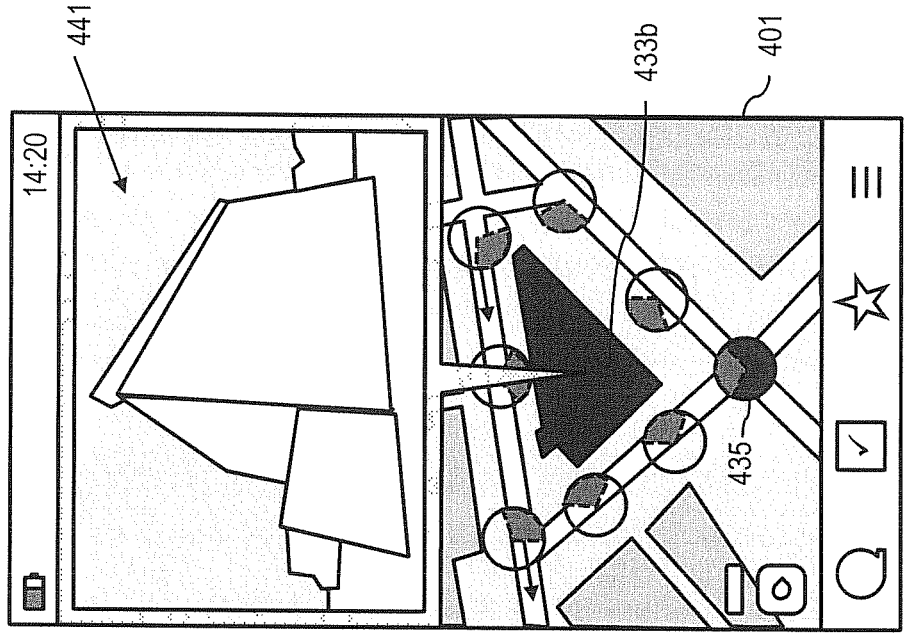
Figure 4J:
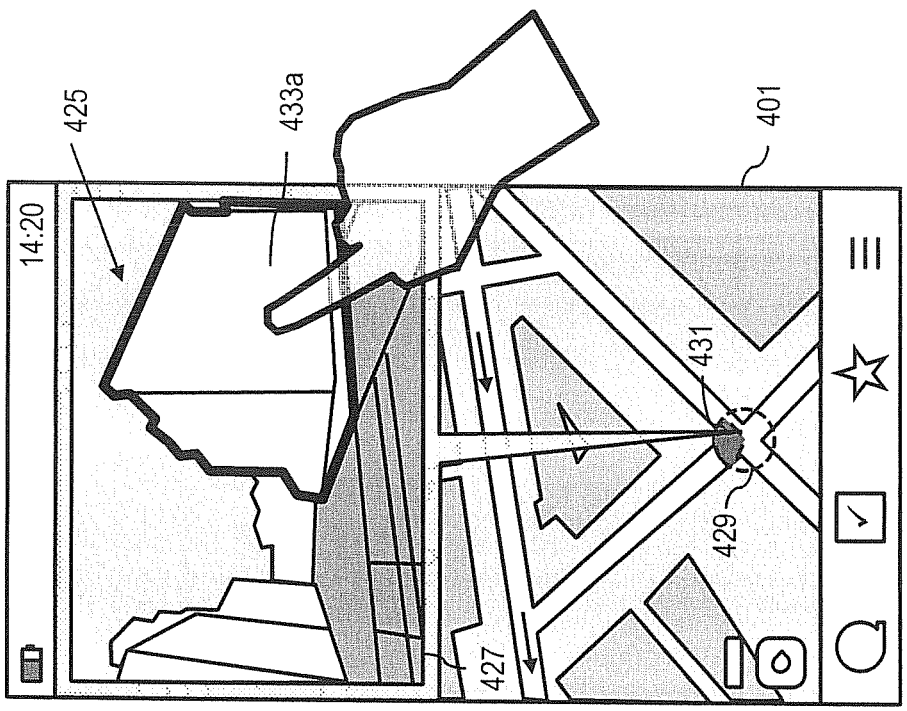

Having selected a location and rendered a corresponding user interface element for viewing the image, the user may select a specific POI featured in the panoramic image to view from various vantage points. This is depicted, by way of example in FIG. 4I. Under this scenario, the user provides an extended touch input to the interface 401 for selecting a building 433a featured within the image 425. Resultantly, the building as depicted from a top-down view 433b is highlighted on the map as shown in FIG. 4J. In addition, all available vantage point selection indicators (e.g., vantage point indicator selector 435) for the building 433b are shown.

Figure 4K:
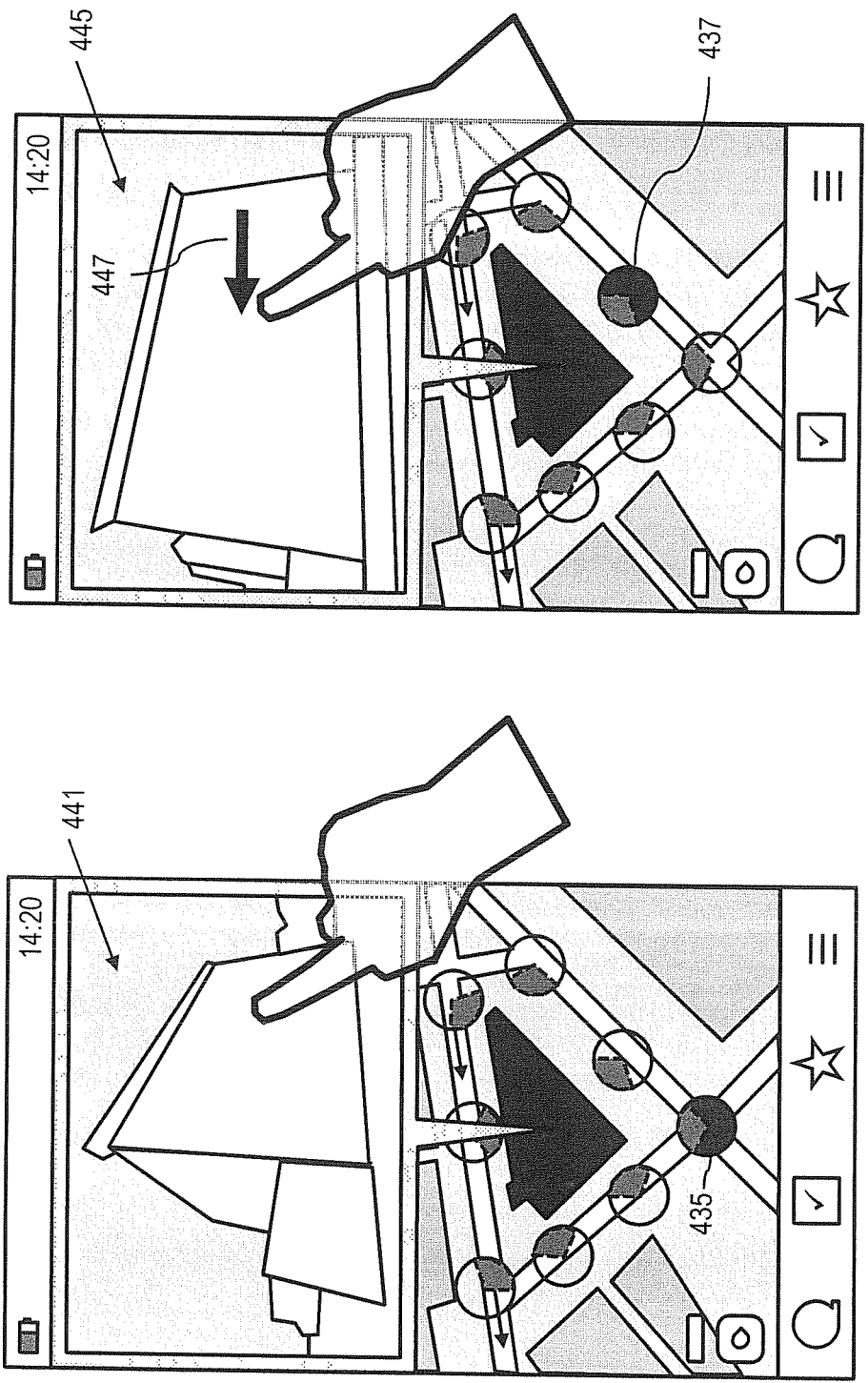
Figure 4L:
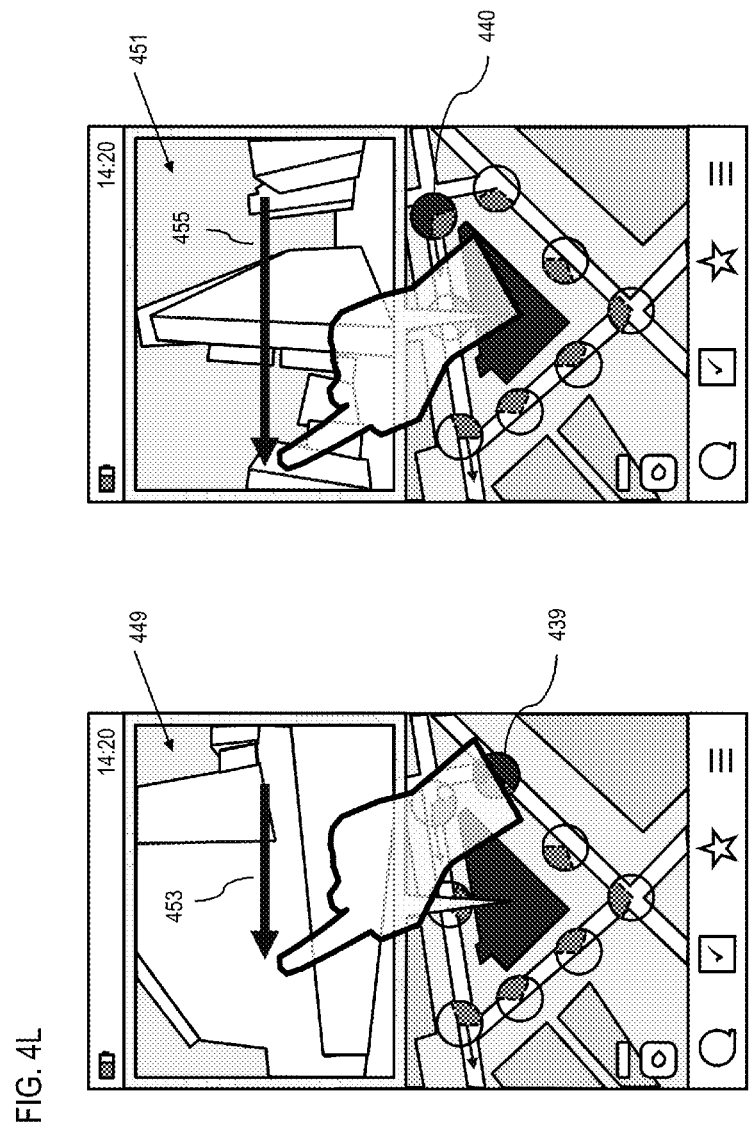

The user selects a vantage point indicator selector to view a different panoramic image of the building from different angles and corresponding fields-of-view per FIGS. 4K and 4L. For example, vantage point indicator selector 435 corresponds to panoramic image 441, vantage point indicator selector 437 corresponds to panoramic image 445, vantage point indicator selector 439 corresponds to panoramic image 449 and vantage point indicator selector 440 corresponds to panoramic image 451. Alternatively, the user may switch between the different panoramic images for each vantage point by swiping left or right on a given panoramic image, as depicted by directional arrows 447, 453 and 455. As yet another alternative, the field-of-view generator 111 may be configured to automatically show each image for a limited period of time and then advance to the next available vantage point automatically.

The field-of-view generator 111 may also support augmented reality applications, as mentioned previously. For example, building 433a as depicted in FIG. 4I could be an augmented reality view of said point-of-interest rather than a panoramic image, i.e., corresponding to an augmented reality user interface and/or mode of operation. As such, selection of the building 443a is from the augmented reality view. Under this scenario, after selecting the building, the field-of-view generator 111 may cause the application subsequently present corresponding panoramic image and map data as in FIG. 4J. Hence, the field-of-view generator 111 facilitates matching of the building presented in augmented reality mode/view with the appropriate panorama image data for the respective location and vantage point indicated on the map.

The processes described herein for enabling a user to view a location from different fields-of-view may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 5:
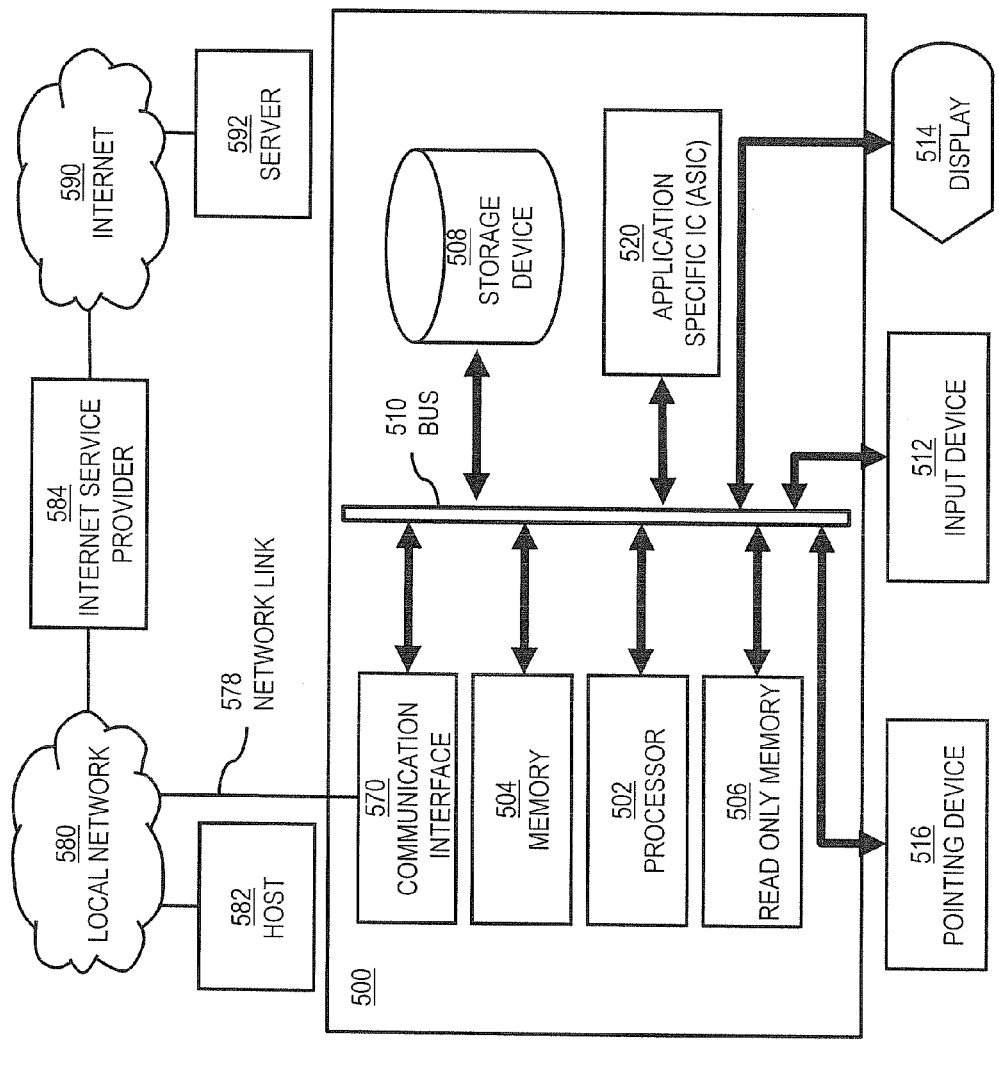
FIG. 5 is a diagram of hardware that can be used to implement an embodiment of the invention.

FIG. 5 illustrates a computer system 500 upon which an embodiment of the invention may be implemented. Although computer system 500 is depicted with respect to a particular device or equipment, it is contemplated that other devices or equipment (e.g., network elements, servers, etc.) within FIG. 5 can deploy the illustrated hardware and components of system 500. Computer system 500 is programmed (e.g., via computer program code or instructions) to enable a user to view a location from different fields-of-view as described herein and includes a communication mechanism such as a bus 510 for passing information between other internal and external components of the computer system 500. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 500, or a portion thereof, constitutes a means for performing one or more steps of enabling a user to view a location from different fields-of-view.

A bus 510 includes one or more parallel conductors of information so that information is transferred quickly among devices coupled to the bus 510. One or more processors 502 for processing information are coupled with the bus 510.

A processor (or multiple processors) 502 performs a set of operations on information as specified by computer program code related to enable a user to view a location from different fields-of-view. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 510 and placing information on the bus 510. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 502, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 500 also includes a memory 504 coupled to bus 510. The memory 504, such as a random access memory (RAM) or any other dynamic storage device, stores information including processor instructions for enabling a user to view a location from different fields-of-view. Dynamic memory allows information stored therein to be changed by the computer system 500. RAM allows a unit of information stored at a location called a memory address to be stored and retrieved independently of information at neighboring addresses. The memory 504 is also used by the processor 502 to store temporary values during execution of processor instructions. The computer system 500 also includes a read only memory (ROM) 506 or any other static storage device coupled to the bus 510 for storing static information, including instructions, that is not changed by the computer system 500. Some memory is composed of volatile storage that loses the information stored thereon when power is lost. Also coupled to bus 510 is a non-volatile (persistent) storage device 508, such as a magnetic disk, optical disk or flash card, for storing information, including instructions, that persists even when the computer system 500 is turned off or otherwise loses power.

Information, including instructions for enabling a user to view a location from different fields-of-view, is provided to the bus 510 for use by the processor from an external input device 512, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 500. Other external devices coupled to bus 510, used primarily for interacting with humans, include a display device 514, such as a cathode ray tube (CRT), a liquid crystal display (LCD), a light emitting diode (LED) display, an organic LED (OLED) display, a plasma screen, or a printer for presenting text or images, and a pointing device 516, such as a mouse, a trackball, cursor direction keys, or a motion sensor, for controlling a position of a small cursor image presented on the display 514 and issuing commands associated with graphical elements presented on the display 514. In some embodiments, for example, in embodiments in which the computer system 500 performs all functions automatically without human input, one or more of external input device 512, display device 514 and pointing device 516 is omitted.

In the illustrated embodiment, special purpose hardware, such as an application specific integrated circuit (ASIC) 520, is coupled to bus 510. The special purpose hardware is configured to perform operations not performed by processor 502 quickly enough for special purposes. Examples of ASICs include graphics accelerator cards for generating images for display 514, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 500 also includes one or more instances of a communications interface 570 coupled to bus 510. Communication interface 570 provides a one-way or two-way communication coupling to a variety of external devices that operate with their own processors, such as printers, scanners and external disks. In general the coupling is with a network link 578 that is connected to a local network 580 to which a variety of external devices with their own processors are connected. For example, communication interface 570 may be a parallel port or a serial port or a universal serial bus (USB) port on a personal computer. In some embodiments, communications interface 570 is an integrated services digital network (ISDN) card or a digital subscriber line (DSL) card or a telephone modem that provides an information communication connection to a corresponding type of telephone line. In some embodiments, a communication interface 570 is a cable modem that converts signals on bus 510 into signals for a communication connection over a coaxial cable or into optical signals for a communication connection over a fiber optic cable. As another example, communications interface 570 may be a local area network (LAN) card to provide a data communication connection to a compatible LAN, such as Ethernet. Wireless links may also be implemented. For wireless links, the communications interface 570 sends or receives or both sends and receives electrical, acoustic or electromagnetic signals, including infrared and optical signals, that carry information streams, such as digital data. For example, in wireless handheld devices, such as mobile telephones like cell phones, the communications interface 570 includes a radio band electromagnetic transmitter and receiver called a radio transceiver. In certain embodiments, the communications interface 570 enables connection to the communication network 105 for enabling a user to view a location from different fields-of-view to the UE 101.

The term "computer-readable medium" as used herein refers to any medium that participates in providing information to processor 502, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 508. Volatile media include, for example, dynamic memory 504. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 520.

Network link 578 typically provides information communication using transmission media through one or more networks to other devices that use or process the information. For example, network link 578 may provide a connection through local network 580 to a host computer 582 or to equipment 584 operated by an Internet Service Provider (ISP). ISP equipment 584 in turn provides data communication services through the public, world-wide packet-switching communication network of networks now commonly referred to as the Internet 590.

A computer called a server host 592 connected to the Internet hosts a process that provides a service in response to information received over the Internet. For example, server host 592 hosts a process that provides information representing video data for presentation at display 514. It is contemplated that the components of system 500 can be deployed in various configurations within other computer systems, e.g., host 582 and server 592.

At least some embodiments of the invention are related to the use of computer system 500 for implementing some or all of the techniques described herein. According to one embodiment of the invention, those techniques are performed by computer system 500 in response to processor 502 executing one or more sequences of one or more processor instructions contained in memory 504. Such instructions, also called computer instructions, software and program code, may be read into memory 504 from another computer-readable medium such as storage device 508 or network link 578. Execution of the sequences of instructions contained in memory 504 causes processor 502 to perform one or more of the method steps described herein. In alternative embodiments, hardware, such as ASIC 520, may be used in place of or in combination with software to implement the invention. Thus, embodiments of the invention are not limited to any specific combination of hardware and software, unless otherwise explicitly stated herein.

The signals transmitted over network link 578 and other networks through communications interface 570, carry information to and from computer system 500. Computer system 500 can send and receive information, including program code, through the networks 580, 590 among others, through network link 578 and communications interface 570. In an example using the Internet 590, a server host 592 transmits program code for a particular application, requested by a message sent from computer 500, through Internet 590, ISP equipment 584, local network 580 and communications interface 570. The received code may be executed by processor 502 as it is received, or may be stored in memory 504 or in storage device 508 or any other non-volatile storage for later execution, or both. In this manner, computer system 500 may obtain application program code in the form of signals on a carrier wave.

Various forms of computer readable media may be involved in carrying one or more sequence of instructions or data or both to processor 502 for execution. For example, instructions and data may initially be carried on a magnetic disk of a remote computer such as host 582. The remote computer loads the instructions and data into its dynamic memory and sends the instructions and data over a telephone line using a modem. A modem local to the computer system 500 receives the instructions and data on a telephone line and uses an infra-red transmitter to convert the instructions and data to a signal on an infra-red carrier wave serving as the network link 578. An infrared detector serving as communications interface 570 receives the instructions and data carried in the infrared signal and places information representing the instructions and data onto bus 510. Bus 510 carries the information to memory 504 from which processor 502 retrieves and executes the instructions using some of the data sent with the instructions. The instructions and data received in memory 504 may optionally be stored on storage device 508, either before or after execution by the processor 502.

FIG. 6 illustrates a chip set or chip 600 upon which an embodiment of the invention may be implemented. Chip set 600 is programmed to enable a user to view a location from different fields-of-view as described herein and includes, for instance, the processor and memory components described with respect to FIG. 5 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 600 can be implemented in a single chip. It is further contemplated that in certain embodiments the chip set or chip 600 can be implemented as a single "system on a chip." It is further contemplated that in certain embodiments a separate ASIC would not be used, for example, and that all relevant functions as disclosed herein would be performed by a processor or processors. Chip set or chip 600, or a portion thereof, constitutes a means for performing one or more steps of providing user interface navigation information associated with the availability of functions. Chip set or chip 600, or a portion thereof, constitutes a means for performing one or more steps of enabling a user to view a location from different fields-of-view.

In one embodiment, the chip set or chip 600 includes a communication mechanism such as a bus 601 for passing information among the components of the chip set 600. A processor 603 has connectivity to the bus 601 to execute instructions and process information stored in, for example, a memory 605. The processor 603 may include one or more processing cores with each core configured to perform independently. A multi-core processor enables multiprocessing within a single physical package. Examples of a multi-core processor include two, four, eight, or greater numbers of processing cores. Alternatively or in addition, the processor 603 may include one or more microprocessors configured in tandem via the bus 601 to enable independent execution of instructions, pipelining, and multithreading. The processor 603 may also be accompanied with one or more specialized components to perform certain processing functions and tasks such as one or more digital signal processors (DSP) 607, or one or more application-specific integrated circuits (ASIC) 609. A DSP 607 typically is configured to process real-world signals (e.g., sound) in real time independently of the processor 603. Similarly, an ASIC 609 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 600 includes merely one or more processors and some software and/or firmware supporting and/or relating to and/or for the one or more processors.

The processor 603 and accompanying components have connectivity to the memory 605 via the bus 601. The memory 605 includes both dynamic memory (e.g., RAM, magnetic disk, writable optical disk, etc.) and static memory (e.g., ROM, CD-ROM, etc.) for storing executable instructions that when executed perform the inventive steps described herein to enable a user to view a location from different fields-of-view. The memory 605 also stores the data associated with or generated by the execution of the inventive steps.

FIG. 7 is a diagram of exemplary components of a mobile terminal (e.g., handset) for communications, which is capable of operating in the system of FIG. 1, according to one embodiment. In some embodiments, mobile terminal 701, or a portion thereof, constitutes a means for performing one or more steps of enabling a user to view a location from different fields-of-view. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 703, a Digital Signal Processor (DSP) 705, and a receiver/transmitter unit including a microphone gain control unit and a speaker gain control unit. A main display unit 707 provides a display to the user in support of various applications and mobile terminal functions that perform or support the steps of enabling a user to view a location from different fields-of-view. The display 707 includes display circuitry configured to display at least a portion of a user interface of the mobile terminal (e.g., mobile telephone). Additionally, the display 707 and display circuitry are configured to facilitate user control of at least some functions of the mobile terminal. An audio function circuitry 709 includes a microphone 711 and microphone amplifier that amplifies the speech signal output from the microphone 711. The amplified speech signal output from the microphone 711 is fed to a coder/decoder (CODEC) 713.

A radio section 715 amplifies power and converts frequency in order to communicate with a base station, which is included in a mobile communication system, via antenna 717. The power amplifier (PA) 719 and the transmitter/modulation circuitry are operationally responsive to the MCU 703, with an output from the PA 719 coupled to the duplexer 721 or circulator or antenna switch, as known in the art. The PA 719 also couples to a battery interface and power control unit 720.

In use, a user of mobile terminal 701 speaks into the microphone 711 and his or her voice along with any detected background noise is converted into an analog voltage. The analog voltage is then converted into a digital signal through the Analog to Digital Converter (ADC) 723. The control unit 703 routes the digital signal into the DSP 705 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 725 for compensation of any frequency-dependent impairments that occur during transmission though the air such as phase and amplitude distortion. After equalizing the bit stream, the modulator 727 combines the signal with a RF signal generated in the RF interface 729. The modulator 727 generates a sine wave by way of frequency or phase modulation. In order to prepare the signal for transmission, an up-converter 731 combines the sine wave output from the modulator 727 with another sine wave generated by a synthesizer 733 to achieve the desired frequency of transmission. The signal is then sent through a PA 719 to increase the signal to an appropriate power level. In practical systems, the PA 719 acts as a variable gain amplifier whose gain is controlled by the DSP 705 from information received from a network base station. The signal is then filtered within the duplexer 721 and optionally sent to an antenna coupler 735 to match impedances to provide maximum power transfer. Finally, the signal is transmitted via antenna 717 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 701 are received via antenna 717 and immediately amplified by a low noise amplifier (LNA) 737. A down-converter 739 lowers the carrier frequency while the demodulator 741 strips away the RF leaving only a digital bit stream. The signal then goes through the equalizer 725 and is processed by the DSP 705. A Digital to Analog Converter (DAC) 743 converts the signal and the resulting output is transmitted to the user through the speaker 745, all under control of a Main Control Unit (MCU) 703 which can be implemented as a Central Processing Unit (CPU).

The MCU 703 receives various signals including input signals from the keyboard 747. The keyboard 747 and/or the MCU 703 in combination with other user input components (e.g., the microphone 711) comprise a user interface circuitry for managing user input. The MCU 703 runs a user interface software to facilitate user control of at least some functions of the mobile terminal 701 to enable a user to view a location from different fields-of-view. The MCU 703 also delivers a display command and a switch command to the display 707 and to the speech output switching controller, respectively. Further, the MCU 703 exchanges information with the DSP 705 and can access an optionally incorporated SIM card 749 and a memory 751. In addition, the MCU 703 executes various control functions required of the terminal. The DSP 705 may, depending upon the implementation, perform any of a variety of conventional digital processing functions on the voice signals. Additionally, DSP 705 determines the background noise level of the local environment from the signals detected by microphone 711 and sets the gain of microphone 711 to a level selected to compensate for the natural tendency of the user of the mobile terminal 701.

The CODEC 713 includes the ADC 723 and DAC 743. The memory 751 stores various data including call incoming tone data and is capable of storing other data including music data received via, e.g., the global Internet. The software module could reside in RAM memory, flash memory, registers, or any other form of writable storage medium known in the art. The memory device 751 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 749 carries, for instance, important information, such as the cellular phone number, the carrier supplying service, subscription details, and security information. The SIM card 749 serves primarily to identify the mobile terminal 701 on a radio network. The card 749 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising facilitating a processing of and/or processing (1) data and/or (2) information and/or (3) at least one signal, the (1) data and/or (2) information and/or (3) at least one signal based, at least in part, on the following:
   a rendering of a user interface element representing a field-of-view;
   at least one determination of one or more parameters of the field-of-view, based, at least in part, on one or more interactions with the user interface element; and
   at least one determination of whether a portion of at least one panoramic image is visible in the field-of-view based, at least in part, on the one or more parameters; and
   a rendering of another user interface element representing the portion of the at least one panoramic image that is visible in the field-of-view, wherein the another user interface element overlays the user interface element.

2. A method of claim 1, wherein the (1) data and/or (2) information and/or (3) at least one signal are further based, at least in part, on the following:
   a location associated with the field-of-view; and
   a rendering of the user interface element in a location-based user interface, an augmented reality user interface, or a combination thereof based, at least in part, on the location.

3. A method of claim 2, wherein the user interface element includes, at least in part, at least one representation of the field-of-view, and wherein the at least one representation includes, at least in part, a rendering of a triangle to represent a view sector of the field-of-view.

4. A method of claim 1, wherein the (1) data and/or (2) information and/or (3) at least one signal are further based, at least in part, on the following:
   a processing of one or more other interactions with the another user interface element to determine one or more updates to the one or more parameters; and
   an updating of the field-of-view, the user interface element representing the field-of-view, the another user interface element, the portion of the at least one panoramic image, or a combination thereof based, at least in part, on the one or more updates.

5. A method of claim 2, wherein the (1) data and/or (2) information and/or (3) at least one signal are further based, at least in part, on the following:
   an input for specifying at least one object depicted in the at least one panoramic image; and
   at least one determination of one or more other panoramic images that depict one or more different view angles of the at least one object.

6. A method of claim 5, wherein the (1) data and/or (2) information and/or (3) at least one signal are further based, at least in part, on the following:
   at least one determination of one or more vantage points associated with the at least one panoramic image, the one or more other panoramic images, or a combination thereof; and
   a rendering of the one or more vantage points in relation to at least one representation of the at least one object.

7. A method of claim 6, wherein the one or more vantage points is based, at least in part, on one or more respective locations, one or more respective fields-of-view, or a combination thereof associated with the one or more different view angles of the at least one object.

8. A method of claim 7, wherein the (1) data and/or (2) information and/or (3) at least one signal are further based, at least in part, on the following:
   at least one determination of the one or more vantage points based, at least in part, on whether the at least one object fits within the one or more respective fields-of-view.

9. A method of claim 6, wherein the (1) data and/or (2) information and/or (3) at least one signal are further based, at least in part, on the following:
   at least one determination of one or more obstructions to viewing the at least one object from the one or more vantage points; and
   at least one determination to select at least one of the one or more vantage points based, at least in part, on the one or more obstructions.

10. A method of claim 5, wherein the (1) data and/or (2) information and/or (3) at least one signal are further based, at least in part, on the following:
    another input for specifying a rotation of the at least one object; and
    a rendering of the at least one panoramic image, the one or more other panoramic images, or a combination thereof to cause, at least in part, a presentation of the rotation.

11. A method of claim 1, wherein the (1) data and/or (2) information and/or (3) at least one signal are further based, at least in part, on the following:
    a processing of one or more other interactions with the user interface element to determine one or more updates to the one or more parameters; and
    an updating of the portion of the at least one panoramic image, the another user interface element representing the portion of the at least one panoramic image, the user interface element, the field-of-view, or a combination thereof based, at least in part, on the one or more updates.

12. An apparatus comprising:
    at least one processor; and
    at least one memory including computer program code for one or more programs,
    the at least one memory and the computer program code configured to, with the at least one processor, cause the apparatus to perform at least the following,
    cause, at least in part, a rendering of a user interface element representing a field-of-view;
    process and/or facilitate a processing of one or more interactions with the user interface element to determine one or more parameters of the field-of-view;
    determine a portion of at least one panoramic image that is visible in the field-of-view based, at least in part, on the one or more parameters; and
    cause, at least in part, a rendering of another user interface element representing the portion of the at least one panoramic image that is visible in the field-of-view, wherein the another user interface element overlays the user interface element.

13. An apparatus of claim 12, wherein the apparatus is further caused to:
    determine a location associated with the field-of-view; and
    cause, at least in part, a rendering of the user interface element in a location-based user interface, an augmented reality user interface, or a combination thereof based, at least in part, on the location.

14. An apparatus of claim 13, wherein the user interface element includes, at least in part, at least one representation of the field-of-view, and wherein the at least one representation includes, at least in part, a rendering of a triangle to represent a view sector of the field-of-view.

15. An apparatus of claim 12, wherein the apparatus is further caused to:
    process and/or facilitate a processing of one or more other interactions with the another user interface element to determine one or more updates to the one or more parameters; and
    cause, at least in part, an updating of the field-of-view, the user interface element representing the field-of-view, the another user interface element, the portion of the at least one panoramic image, or a combination thereof based, at least in part, on the one or more updates.

16. An apparatus of claim 12, wherein the apparatus is further caused to:
    determine an input for specifying at least one object depicted in the at least one panoramic image; and
    determine one or more other panoramic images that depict one or more different view angles of the at least one object.

17. An apparatus of claim 16, wherein the apparatus is further caused to:
    determine one or more vantage points associated with the at least one panoramic image, the one or more other panoramic images, or a combination thereof; and
    cause, at least in part, a rendering of the one or more vantage points in relation to at least one representation of the at least one object.

18. An apparatus of claim 17, wherein the one or more vantage points is based, at least in part, on one or more respective locations, one or more respective fields-of-view, or a combination thereof associated with the one or more different view angles of the at least one object.

19. An apparatus of claim 18, wherein the apparatus is further caused to:
    determine the one or more vantage points based, at least in part, on whether the at least one object fits within the one or more respective fields-of-view.

20. An apparatus of claim 17, wherein the apparatus is further caused to:
    determine one or more obstructions to viewing the at least one object from the one or more vantage points; and
    determine to select the one or more vantage points based, at least in part, on the one or more obstructions.

21. An apparatus of claim 16, wherein the apparatus is further caused to:
    determine another input for specifying a rotation of the at least one object; and
    cause, at least in part, a rendering of the at least one panoramic image, the one or more other panoramic images, or a combination thereof to cause, at least in part, a presentation of the rotation.

\* \* \* \* \*